United States Patent
Poirot-Crouvezier et al.

(10) Patent No.: US 8,142,940 B2
(45) Date of Patent: Mar. 27, 2012

(54) FUEL CELL WITH FLAT ASSEMBLY AND SIMPLIFIED SEALING

(75) Inventors: Jean-Philippe Poirot-Crouvezier, Saint-Georges de Commiers (FR); Philippe Manicardi, Fontaine (FR); Audrey Montaut, Grenoble (FR); Jean Oriol, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 661 days.

(21) Appl. No.: 12/331,825

(22) Filed: Dec. 10, 2008

(65) Prior Publication Data

US 2009/0155670 A1 Jun. 18, 2009

(30) Foreign Application Priority Data

Dec. 17, 2007 (FR) ...................... 07 59896

(51) Int. Cl.
*H01M 8/06* (2006.01)
(52) U.S. Cl. .................. 429/415; 429/469; 429/507
(58) Field of Classification Search .................. 429/415, 429/507, 508, 509, 510, 511, 469, 99, 452, 429/470, 471
See application file for complete search history.

(56) References Cited

U.S. PATENT DOCUMENTS

| | | | |
|---|---|---|---|
| 5,925,477 A | 7/1999 | Ledjeff et al. | |
| 6,589,681 B1 * | 7/2003 | Yamanis | 429/454 |
| 2003/0198853 A1 | 10/2003 | Choi et al. | |
| 2004/0142227 A1 * | 7/2004 | Sugai et al. | 429/38 |
| 2005/0202304 A1 | 9/2005 | Peace et al. | |
| 2005/0255342 A1 | 11/2005 | Lee et al. | |
| 2008/0166616 A1 * | 7/2008 | Badding et al. | 429/30 |
| 2008/0206623 A1 * | 8/2008 | Friedman | 429/40 |
| 2008/0220304 A1 * | 9/2008 | Spaner et al. | 429/25 |

FOREIGN PATENT DOCUMENTS

| | | |
|---|---|---|
| FR | 1 452 564 | 12/1966 |
| GB | 1091303 | 11/1967 |
| JP | 10-214634 | 8/1998 |

* cited by examiner

*Primary Examiner* — Hae Moonhyeon
(74) *Attorney, Agent, or Firm* — Oblon, Spivak, McClelland, Maier & Neustadt, L.L.P.

(57) ABSTRACT

A flat fuel cell including: at least two unit cells, a casing provided with supports for each of said unit cells, said supports offering a bearing surface to a periphery of the unit cells, a sealing member interposed between the periphery of each unit cell and the surface of an associated support, and a cover forming a compression element coming into abutment on the periphery of each unit cell opposite the sealing member and cooperating directly with the associated support in order to provide compression of the sealing member.

18 Claims, 3 Drawing Sheets

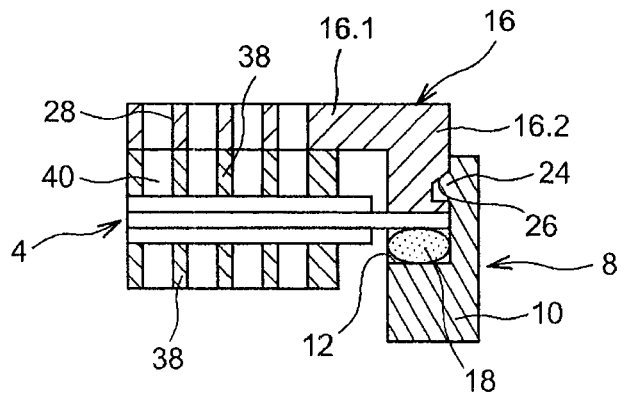
FIG. 2A
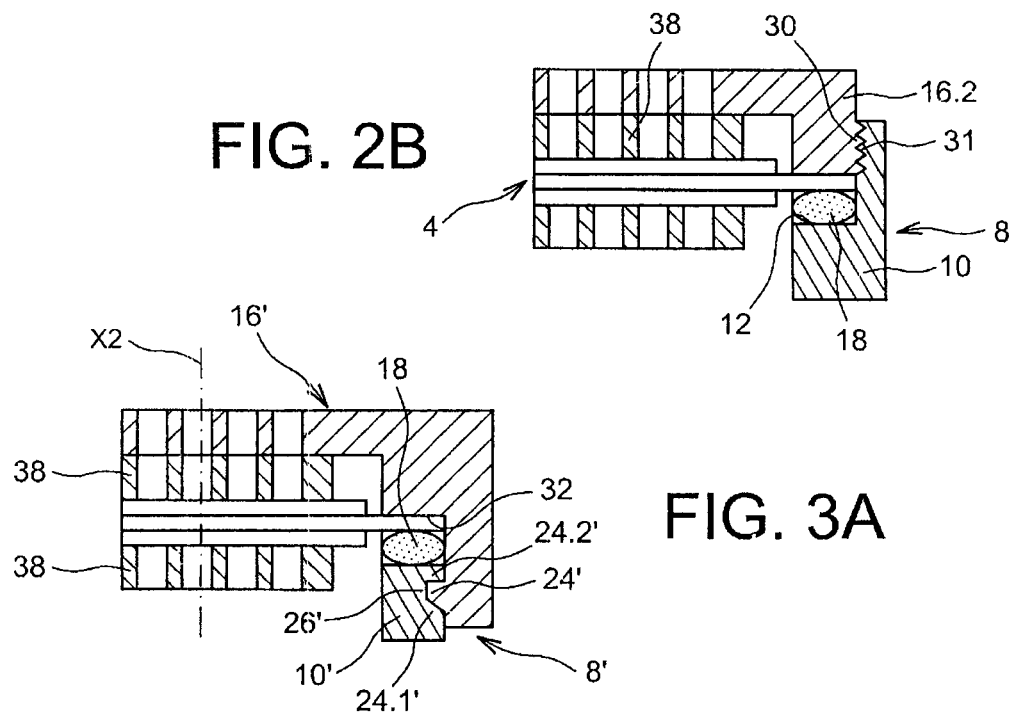
FIG. 2B
FIG. 3A
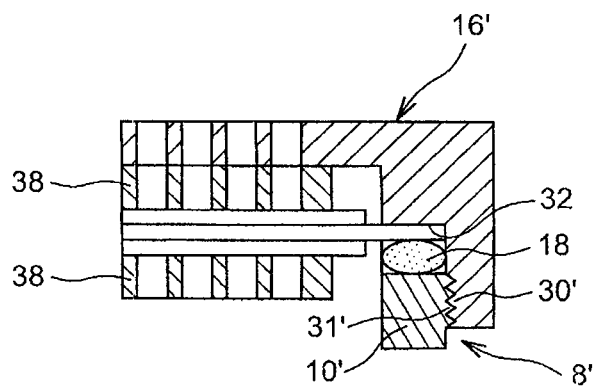
FIG. 3B

FUEL CELL WITH FLAT ASSEMBLY AND SIMPLIFIED SEALING

TECHNICAL FIELD AND PRIOR ART

The present invention relates mainly to a flat fuel cell, and more particular to fuel cells operating at low temperature and using a membrane as electrolyte.

There exist two types of fuel cell design:

Fuel cells according to the first type are formed by a stack of unit cells.

An unit cell comprises an electrolyte and two electrodes on each side, an electrode fulfilling the function of anode where an oxidation reaction takes place, and an electrode fulfilling the function of a cathode where a reduction reaction takes place.

In the case of a stack of cells, electron conductors, of the bipolar plate type, are interposed between the cathode of one cell and the anode of a following cell.

In addition, means for the continuous supply of reactants are provided at the anode and cathode.

In this first type of cell, lateral sealing and sealing at the ends of the stack must be provided. These seals are in particular obtained by the application of a permanent clamping force in the direction of the stack by a nut and screw system. In addition, it is necessary to provide an individual supply of reactants for each anode and cathode.

The fuel cells of the second type are flat, examples of such cells are described in the documents FR 1 452 564 and U.S. Pat. No. 5,925,477.

These fuel cells comprise a plurality of unit cells overlapping partially and connected electrically. These unit cells form a "layer of cells", one side of which is covered with cathodes and another side of which is covered with anodes. The supply of reactants is then simplified since a conduit suffices for bringing the reactant to the face formed by anodes and a conduit for bringing the reactant to the face formed by cathodes.

The major problem in the manufacture of such a cell is the achievement of sealing to the reactants, in particular gases, for example oxygen and hydrogen in the case of a hydrogen fuel cell. The sealing is obtained by numerous bondings and clampings, as for the fuel cells of the unit cell stack type.

Such a fuel cell then comprises two plates on each side of the cell, joins between the faces of the cell and the plates, and clamping means, of the nut and screw type, connecting the two plates.

This second type of fuel cell has the advantage of offering reduced bulk and weight compared with the stack of unit cells because of the elimination of the bipolar plates. However, since the plates require greater thickness and width to allow this assembly by nut and screw systems, this type of stack can be used only for applications requiring low powers since it is not easy to associate several tens of unit cells in this way on the same plane.

In addition, this type of fuel cell offers reduced performance compared with the first type of fuel cell, in particular because of the connection between the unit cells overlapping.

Finally, the replacement of one of the unit cells is not easy, since it is necessary to make provision for breaking the seal on all the unit cells and separating two unit cells mechanically.

Consequently an aim of the present invention is to offer a flat fuel cell of compact structure and simple design.

Another aim of the present invention is to offer a flat fuel cell whose structure is adapted to offer sufficient power.

DISCLOSURE OF THE INVENTION

The aims previously stated are achieved by a flat fuel cell comprising at least one unit cell in a casing and means cooperating directly with the casing in order to compress a seal interposed between the casing and the unit cell.

In other words, the compression of the seal is obtained by cooperation of a male part and a female part, carried by the cover and casing without requiring any additional element.

Assembly is therefore simpler. Moreover, in the case where the flat fuel cell comprises several unit cells, individual action on each unit cell is easy and does not damage the other unit cells.

The weight and bulk are reduced since the parts participating in the sealing can be less rigid and less large, and the quantity of material can then be reduced. The cost price of it is also reduced.

In addition, the flat fuel cell according to the present invention can offer high power, since the number of associated unit cells may be very large.

The flat fuel cell according to the present invention comprises at least one unit cell, a support for the said unit cell offering a support surface at a periphery of the unit cell, sealing means interposed between the periphery of the unit cell and the surface of the support, and a compression element coming into abutment on the periphery of the unit cell opposite to the sealing means and cooperating directly with the support in order to ensure compression of the sealing means.

Direct cooperation between the support and the compression element means direct interaction by contact between an element forming part of the compression element and an element forming part of the support.

The subject-matter of the present invention is then mainly a flat fuel cell comprising at least two unit cells juxtaposed in one plane, a casing provided with supports for each unit cell, each support offering a bearing surface at a periphery of an unit cell, the said fuel cell also comprising sealing means interposed between the periphery of each unit cell and the surface of its support, and a compression element, associated with each support, coming into abutment on the periphery of the unit cell opposite to the sealing means and cooperating directly with the associated support in order to provide compression of the sealing means, the said casing delimiting a reactant supply chamber, a first electrode of each of the unit cells being in contact with the internal volume of the supply chamber, a second electrode of each unit cell being oriented towards the outside of the casing, the said compression of the sealing means providing a seal for the supply chamber vis-á-vis the outside of the casing.

In an example embodiment, each compression element cooperates with the said associated support by snapping on.

Each compression element can enter inside the said associated support, the said support comprising a shoulder forming the support surface on which the periphery of the unit cell rests and a projection, and a compression element comprising a recess receiving the projection.

In a variant embodiment, each support enters inside the said associated compression element, the sealing means resting on an axial end of the support forming the bearing surface, the said support comprising a recess, and the said compression element comprising a shoulder applied to the sealing means and at least one projection entering the recess. The projection is for example an annular rib and the recess is an annular groove.

In another example embodiment, each unit cell can be circular in shape, each support having a circular transverse section and each compression element also has a circular transverse section, each compression element cooperating with the associated support by screwing.

Each compression element can then enter inside said associated support, said support comprising a shoulder forming the support surface, on which the periphery of the unit cell rests, and a screw thread, and the compression element comprising a screw thread cooperating with the screw thread of the support.

In a variant embodiment, each support enters inside said associated compression element, the sealing means resting on an axial end of the support forming the support surface, the support comprising a screw thread, and the compression element comprising a shoulder applied against the sealing means and a screw thread cooperating with the screw thread on the support.

The screw threads are for example formed by inserts.

The periphery of the unit cell disposed between the sealing means and the compression means is advantageously a periphery of an electrolyte in the form of a membrane.

Each compression element can comprise a bottom for forming a cover.

The said bottom may, in one example embodiment, comprise orifices for the supply of reactant to the second electrode.

The fuel cell may comprise electrical conductors in the form of a grille covering the electrodes of each unit cell and connected by electrical connectors to an electrical circuit.

The unit cells may be electrically connected in series.

Provision can be made for the unit cells to be of different sizes and to be connected in parallel.

In one embodiment, the fuel cell comprises at least two first unit cells juxtaposed in a first plane, at least two second unit cells juxtaposed in a second plane, each unit cell among the first unit cells being disposed facing a second unit cell, and an elastic means mounted in compression in abutment against said unit cells.

The fuel cell can comprise a source of hydrogen connected to the supply chamber, the first electrodes forming anodes and the second electrodes forming cathodes, the oxygen coming from the ambient air using the orifices in the caps.

BRIEF DESCRIPTION OF THE DRAWINGS

The present invention will be better understood by means of the following description and the accompanying drawings, in which:

FIG. 2A is a detail view of FIG. 1 in a first example embodiment, FIG. 2B is a detail view of FIG. 1 in a second example embodiment, FIGS. 3A and 3B are detail views of two examples of a second embodiment of a fuel cell according to the present invention.

DETAILED DISCLOSURE OF PARTICULAR EMBODIMENTS

Figure 1:
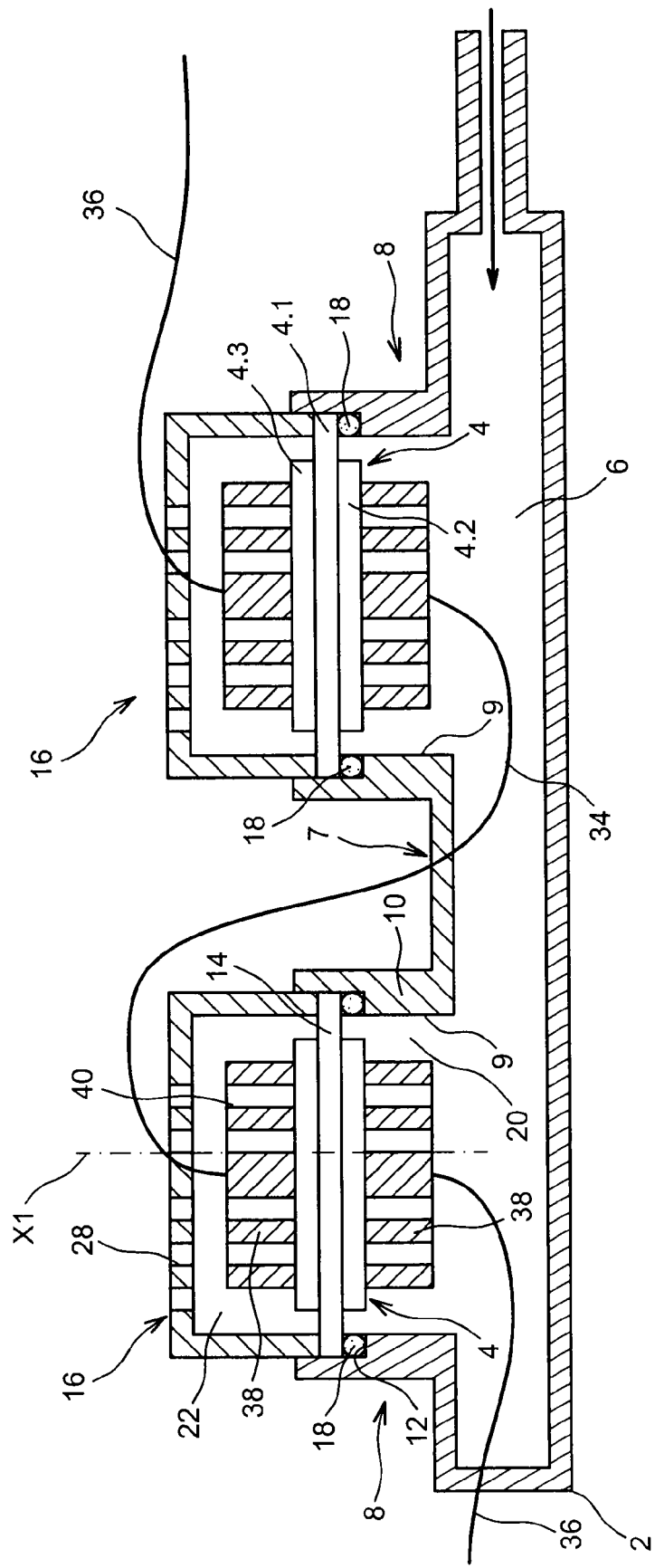
FIG. 1 is a view in longitudinal section of a fuel cell according to the present invention shown schematically.

In FIG. 1, a first embodiment of a fuel cell according to the present invention can be seen, comprising a casing 2 and two unit cells 4.

A unit cell 4 comprises in general terms an electrolyte 4.1, for example in the form of a membrane, and electrodes 4.2, 4.3 fixed to the electrolyte 4.1, on each side thereof.

The fuel cell according to the present invention comprises a plurality of unit cells disposed in a flat assembly. The unit cells are juxtaposed in the same plane.

In the example shown, the fuel cell comprises two unit cells 4 but naturally a fuel cell comprising more than two unit cells 4 does not fall outside the scope of the present invention.

The casing 2 comprises a supply chamber 6 delimited at its top part by a wall 7 provided on its external face with housings 8 for receiving the unit cells 4.

According to the present invention, each unit cell 4 is received in an individual housing of longitudinal axis X1.

An orifice 9 is made in the wall 7 in line with each housing 8.

In the remainder of the description, the unit cells in question have a circular shape, and it will be specified when the unit cells have another shape.

The housings 8 are each formed by a tubular support 10 and an annular shoulder 12 produced on the internal face of the tubular support 10. The tubular supports project from the external face of the wall 7.

The unit cells rest at their radially external periphery 14 on the shoulder 12. Thus the unit cells are suspended, an electrode 4.2 oriented on the supply chamber 6 side and an electrode 4.3 towards the outside of the casing.

The housings 8 are therefore divided by the unit cell 4 into a chamber 20 for the electrode 4.2 and a chamber 22 for the electrode 4.3.

In the example shown, the electrolyte 4.1 has a larger diameter than that of the electrodes 4.2, 4.3. Thus the unit cell is suspended by means of the radially external periphery of the electrolyte 4.1. However, provision can be made for the electrolyte 4.1 and the electrode 4.3, i.e. the electrode situated on the other side of the seal with respect to the zone supplied with hydrogen, to have the same diameter.

According to the present invention, provision is made for individually ensuring the seal at each unit cell instead of effecting a single seal for all the unit cells.

A cap 16 is also provided for each housing 8 covering the unit cell and cooperating with the tubular support 10.

Each housing 8 comprises sealing means 18 intended to isolate the chamber 20 and the chamber 22 from each other in a gastight manner.

In the example shown, the sealing means 18 shown are formed by a flat seal interposed between the shoulder 12 (a bearing surface) and the radially external periphery of the electrolyte 4.1. However, an 0-ring seal, a lip seal or any other seal could also be provided.

According to the present invention, the seal is provided by compression of the flat seal, this compression being obtained by cooperation between the cap 16 and the housing 8, or more particularly between the cap 16 and the tubular support 10. A single seal suffices, and this does not undergo any rubbing from the cap.

In FIG. 2A, an example embodiment of this cooperation can be seen. The fixing of the cap 16 to the tubular support 10 is obtained by snapping on. For this purpose, the inner surface of the tubular support 10 comprises an annular projection 24 radially towards the inside; and the cap formed by a bottom 16.1 and a cylindrical wall 16.2 with an outside diameter substantially equal to the inside diameter of the tubular support 10 comprises an annular groove 26 receiving the annular projection 24.

The groove 26 is provided at a distance from the axial end of the cylindrical wall 16.2 such that, when the projection 24 is in place in the groove 26, the flat seal 18 is compressed, providing a seal between the electrolyte and the shoulder.

The annular projection 24 advantageously comprises, on the same side as the opening end of the housing 8, a face inclined in the direction of the axis X of the housing facilitating the fitting of the cap 16.

The cap is produced from a material such that it deforms elastically when it is fitted and such that it offers sufficient rigidity to ensure permanent compression of the seal 18. The material chosen for the cap may belong for example to the family of polypropylenes, the family of polybutylenes or to that of polyethylenes.

The groove 26 comprises a profile corresponding to the profile of the annular projection 24.

In the example shown, the bottom 16.1 of the cap 16 comprises holes 28 for the gas supply.

In FIG. 2B, another example embodiment of cooperation between the cap 16 and the housing 8 can be seen. In this example, the cap 16 and the housing 8 cooperate by screwing. For this purpose, the external face of the cylindrical wall 16.2 comprises a screw thread 30 and the internal face of the tubular support 10 also comprises a corresponding screw thread 31. Screwing of the cap into the tubular support 10 causes compression of the seal 18.

In FIGS. 3A and 3B, a second embodiment of a fuel cell according to the present invention can be seen, in which the cooperation between the cap and the tubular support takes place from the outside, the cap covering the tubular support.

For this purpose, the unit cell 4, in particular the electrolyte 4.1 in the example shown, rests on the free end of the tubular support 10' (a bearing surface), rather than on a shoulder, and the manufacture of the housing 8' is therefore simplified.

On the other hand, the cap 16' comprises a part with a larger inside diameter and a part of the small inside diameter thus delimiting a shoulder 32 coming into abutment on the radially external periphery of the electrolyte 4.1. A groove 26' is provided in the external face of the tubular support 10' and an annular rib 24' is provided projecting from the internal face of the wall of the cap 16'.

The rib 24' comprises a transverse face 24.1' inclined in the direction of the longitudinal axis X2 of the cylindrical wall 16.2 to facilitate the insertion of the cap 16' and a face 24.2' orthogonal to the axis X2 forming a retaining means.

The distance between the shoulder 32 and the transverse face 24.2' is such that the shoulder 32 effectively compresses the seal 18.

In FIG. 3B, the cap 16' also comprises a shoulder 32; a screw thread 31' is produced on the external face of the casing 10 and a screw thread 30' is provided in the internal face of the cap 16'.

The length of the screw threads is also chosen so as to ensure compression of the seal 18.

Provision could also be made for reversing the groove and projecting rib, for example, in FIG. 2A, the projection could be produced on the cap and the groove in the tubular support.

Figure 4:
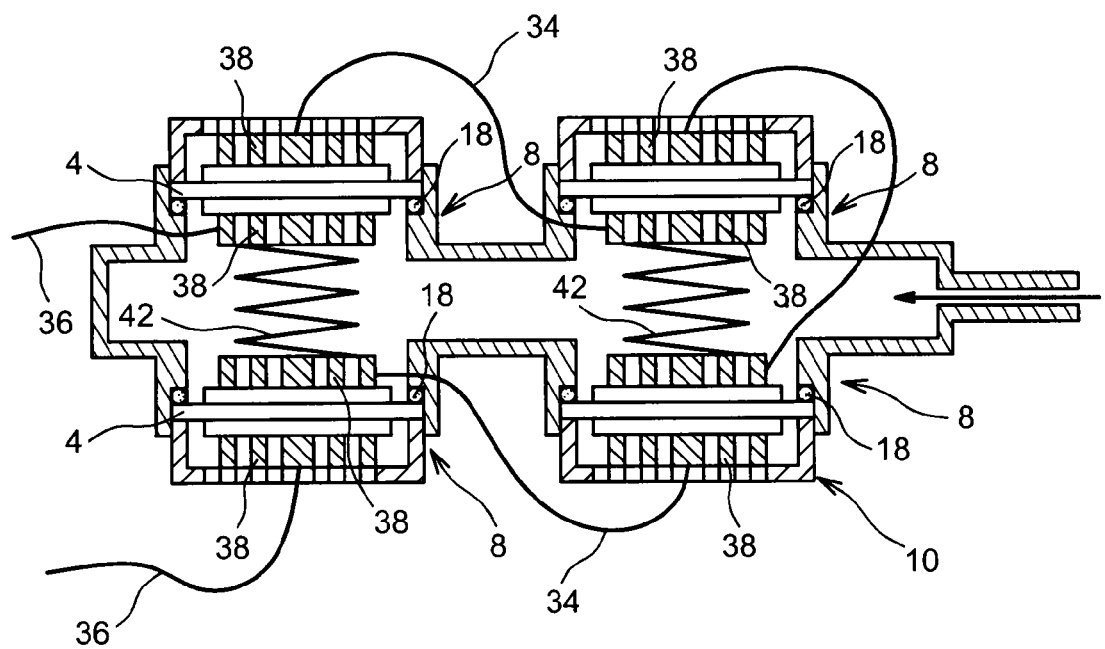
FIG. 4 is a view in section of a variant embodiment of a fuel cell according to the present invention.

The unit cells are connected in series, as shown schematically in FIG. 4.

For this purpose, electronic conductors 38 (which are also interchangeably referred to as grids, collecting plates, and collecting grids) are provided, covering the electrodes and allowing the reactants to pass so that these can come into contact with the electrodes. These electronic conductors are for example formed by grids or perforated sheets. The grids therefore comprise holes 40.

These conductors are advantageously made from metal material.

Provision can be made for the grids 38 disposed on the electrode 4.2, i.e. in the supply chamber 8, to be in abutment on the shoulder or on the end of the support. Other types of holding can of course be envisaged.

The grid 38 on the electrode 4.3 side is advantageously kept clamped between the electrode 4.3 and the cap 16. In this case, the holes 28 in the cap 16 and those holes 40 in the collecting plates 38 are advantageously aligned.

Electrical connections 34 connect the unit cells to each other, in the example shown a connector connects the electrode 4.3 of a unit cell to an electrode 4.2 of a following unit cell, one forming an anode and the other forming a cathode, the connections 36 therefore connect the electron conductors 38 to one another. Electrical connections 36 connect the unit cells to an external electrical circuit.

The connectors 34, 36 are routed between the unit cells so as to reduce the complexity of the seals to be produced.

For example, the supply chamber 6 is connected to a gaseous hydrogen source (not shown), the electrodes 4.2 forming anodes and the electrodes 4.3 forming cathodes, the chamber 20 is supplied with oxygen passing through the holes 28 provided in the cap.

The following reactions take place at the anode and at the cathode respectively:

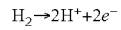

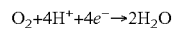

The oxygen can be supplied directly by the ambient air, and the orifices in the cap can be directly in contact with the external environment. In this case, the cap fulfils a role of protecting the cathode, no seal is necessary between the cap and the unit cell. It would then be possible to make provision for replacing the cap with a simple annular ring cooperating with the casing and a protective cap common to all the unit cells, which does not play any role in the sealing. In cases where there is no risk of the cathode being damaged, it is possible not to provide any cap.

The present invention makes it possible to apply, in a simple manner, a substantially continuous force to the entire periphery of the unit cell in order to provide gastightness between the anode chamber and the cathode chamber, this makes it possible to reduce the weight and volume of a fuel cell compared with a fuel cell of the prior art, in which a plurality of screws is used for applying a clamping force over the entire periphery of the fuel cell. The cap according to the invention can be made with a width and thickness less than those of the plates required in flat fuel cells of the prior art.

In the case of cooperation by snapping on, it is also possible to made unit cells having any shape, not only circular.

In addition, in the examples described, the snapping on is achieved by means of an annular ring entering an annular groove, but it is possible to provide fingers entering a common annular groove, or individually entering individual housings.

In the case of cooperation by screwing, it would also be possible to envisage connection means of the bayonet type.

The casing is for example produced from polymer material, inserts, in particular the screw threads, can be provided, providing mechanical reinforcement.

The casing can be produced in a single piece or from several elements bonded or hot welded, avoiding having recourse to seals.

In FIG. 4, a variant embodiment of a fuel cell according to the present invention can be seen, comprising unit cells in a bottom wall and in a top wall, the supply chamber being bordered on its bottom and its top with unit cells 4. Unit cells are juxtaposed in a first plane, and unit cells are juxtaposed in a second plane.

Advantageously, pairs of unit cells are disposed opposite, the collecting grids 38 of each electrode disposed in the supply chamber can then be in abutment one against the other, providing electrical insulation between them.

As shown, it is also possible to interpose a spring 42 mounted in compression between the two opposite unit cells. The spring is held compressed by virtue of the cooperation of the caps with the casings. In the case where the spring is made from electrically conductive material, electrical insulation means (not shown) can also be provided between the two cathodes.

It would be possible to envisage this type of holding for the grid 38 in the case of the embodiment in FIG. 1.

Figure 5:
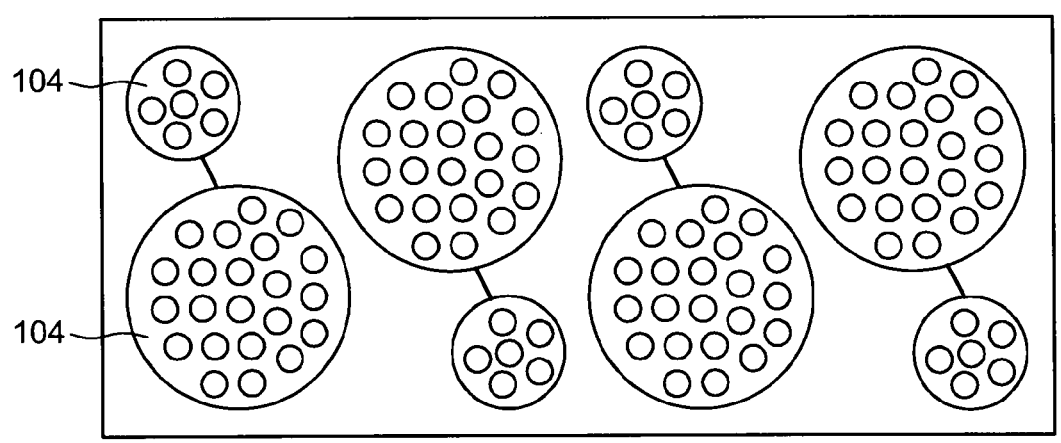
FIG. 5 is a plan view of a fuel cell according to the present invention with increased unit cell density.

In FIG. 5, an example of distribution of circular-shaped cells 104 on a rectangular support can be seen. It is possible, in order to maximise the density of the unit cells, to make provision for producing several circular subcells connected in parallel instead of one, in order to be able better to use the available surface. In the example shown, a plurality of pairs of subcells has been produced.

This mounting in parallel makes it possible to produce unit cells with the same surface area and therefore to keep the same current density (in $A/cm^2$) in all the unit cells.

The present invention also has the advantage of being able to be easily dismantled and to be able to access each unit cell individually so as to be able to repair one of them if necessary.

It can also be envisaged, by virtue of the present invention, producing the seal on the periphery of a layer of unit cells of a fuel cell of the prior art.

The invention claimed is:

1. A flat fuel cell comprising:
   at least two unit cells juxtaposed in one plane,
   a casing provided with supports for each unit cell,
   each support offering a bearing surface at a periphery of an unit cell,
   a sealing member interposed between the periphery of each unit cell and the bearing surface of the support of said unit cell, and
   a compression element, associated with each support, coming into abutment on the periphery of the unit cell opposite to the sealing member and cooperating directly with the associated support in order to provide compression of the sealing member,
   said casing delimiting a reactant supply chamber,
   a first electrode of each of the unit cells being in contact with the internal volume of the supply chamber,
   a second electrode of each unit cell being oriented towards the outside of the casing, and
   said compression of the sealing member providing a seal for the supply chamber vis-à-vis the outside of the casing.

2. The flat fuel cell according to claim 1, wherein each compression element cooperates with said associated support by snapping on.

3. The flat fuel cell according to claim 2, said associated support comprising:
   a shoulder forming the bearing surface on which rests the periphery of the unit cell, and a projection,
   wherein each compression element comprises a recess receiving the projection of the support, and wherein each compression element enters inside said associated support.

4. The flat fuel cell according to claim 2, wherein each support enters inside said associated compression element, the sealing member resting on an axial end of the support forming the bearing surface, said support comprising a recess, and said compression element comprising a shoulder applied against the sealing member and at least one projection entering the recess.

5. The flat fuel cell according to claim 3, wherein the projection is an annular rib and the recess is an annular groove.

6. The flat fuel cell according to claim 1, wherein each unit cell has a circular shape, each support has a circular transverse section and each compression element also has a circular transverse section, each compression element cooperating with the associated support by a screw connection.

7. The flat fuel cell according to claim 6, wherein each compression element enters inside said associated support, said support comprising a shoulder forming the bearing surface, the periphery of the unit cell and a screw thread rest on the bearing surface, and the compression element comprising a screw thread cooperating with the screw thread on the support.

8. The flat fuel cell according to claim 6, wherein each support enters inside said associated compression element, the sealing member resting on an axial end of the support forming the bearing surface, the support comprising a screw thread, and the compression element comprising a shoulder applied to the sealing member and a screw thread cooperating with the screw thread on the support.

9. The flat fuel cell according to claim 1, wherein the periphery of the unit cell disposed between the sealing member and the compression element is a periphery of an electrolyte in the form of a membrane.

10. The flat fuel cell according to claim 7, wherein the screw thread of the support and the screw thread of the compression element are formed by inserts.

11. The flat fuel cell according to claim 1, wherein each compression element comprises a bottom that forms a cover.

12. The flat fuel cell according to claim 11, wherein said bottom comprises orifices that supply reactants to the second electrode.

13. The flat fuel cell according to claim 1, comprising electrical conductors in a form of a grille covering electrodes of each unit cell and connected by electrical connectors to an electrical circuit.

14. The flat fuel cell according to claim 1, wherein the unit cells are electrically connected in series.

15. The flat fuel cell according to claim 1, wherein the unit cells are of different sizes and are connected in parallel.

16. The flat fuel cell according to claim 1, comprising at least two first unit cells juxtaposed in a first plane, at least two second unit cells juxtaposed in a second plane, each unit cell among the first unit cells being disposed opposite a second unit cell, and an elastic member mounted under compression in abutment against said first unit cells.

17. The flat fuel cell according to claim 1 in wherein each compression element comprises a bottom that forms a cover, said bottom comprising orifices that supply reactants to the second electrode, said fuel cell comprising a source of hydrogen connected to the supply chamber, the first electrodes forming anodes and the second electrodes forming cathodes, the oxygen coming from the ambient air following the orifices in the cover.

18. The flat fuel cell according to claim 8, wherein the screw thread of the support and the screw thread of the compression element are formed by inserts.

* * * * *